(12) United States Patent
Oakes et al.

(10) Patent No.: US 6,205,342 B1
(45) Date of Patent: Mar. 20, 2001

(54) USER INTERFACE FOR TEXT MESSAGE CREATION

(75) Inventors: Ronald Bruce Oakes, Palatine, IL (US); David Svoboda, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/282,646

(22) Filed: Mar. 31, 1999

(51) Int. Cl.[7] .............................. H06F 17/21; H04B 1/38
(52) U.S. Cl. .................... 455/566; 455/412; 455/414; 455/575; 707/500; 707/530; 704/1; 704/10
(58) Field of Search ................................. 455/566, 414, 455/412, 550, 575, 158.4, 186.2; 704/1, 10; 707/530–531, 500

(56) References Cited

U.S. PATENT DOCUMENTS

| | | | |
|---|---|---|---|
| 4,095,215 | * | 6/1978 | Mortimer ............................ 455/344 |
| 5,526,259 | * | 6/1996 | Kaji .................................. 379/93.18 |
| 5,758,295 | * | 5/1998 | Ahlberg et al. ...................... 455/566 |
| 5,794,142 | * | 8/1998 | Vanttila et al. ...................... 455/414 |
| 5,802,534 | * | 9/1998 | Hatayama et al. ................... 707/530 |
| 5,841,855 | * | 9/1998 | Davidson et al. ................. 379/93.17 |
| 5,911,485 | * | 6/1999 | Rossmann ......................... 379/93.18 |
| 6,047,198 | * | 4/2000 | Sudo .................................. 455/566 |

* cited by examiner

*Primary Examiner*—Lee Nguyen
*Assistant Examiner*—Simon Nguyen
(74) *Attorney, Agent, or Firm*—J. William Wigert, Jr.; Crosby, Heafey, Roach & May (57) ABSTRACT

Described are methods and apparatuses for composing text messages using wireless electronic devices, such as cellular telephones. Specifically, a word list including a set of pre-selected words and a set of dynamically updated words is stored in a cellular telephone. The words in the word list are then displayed on the cellular telephone in a circular fashion. A user can select the words displayed on the cellular telephone to compose a text message. To reflect word usage pattern of the user, the second set of words is updated based on text messages previously composed.

12 Claims, 6 Drawing Sheets

USER INTERFACE FOR TEXT MESSAGE CREATION

BACKGROUND OF THE INVENTION

1. Field of the Invention

This invention relates generally to generating and sending text messages via a cellular telephone, and more particularly, to an apparatus and method for conveniently generating and accessing a user generated list of words for composing text messages.

2. Related Art

In recent years, wireless electronic devices, such as cellular telephones, have been becoming more and more popular as communication instruments due to their decreasing sizes and increasing mobility. However, because of their size limitations, cellular telephones do not have a keyboard having separate keys for different alpha and numerical characters.

Figure 1A:
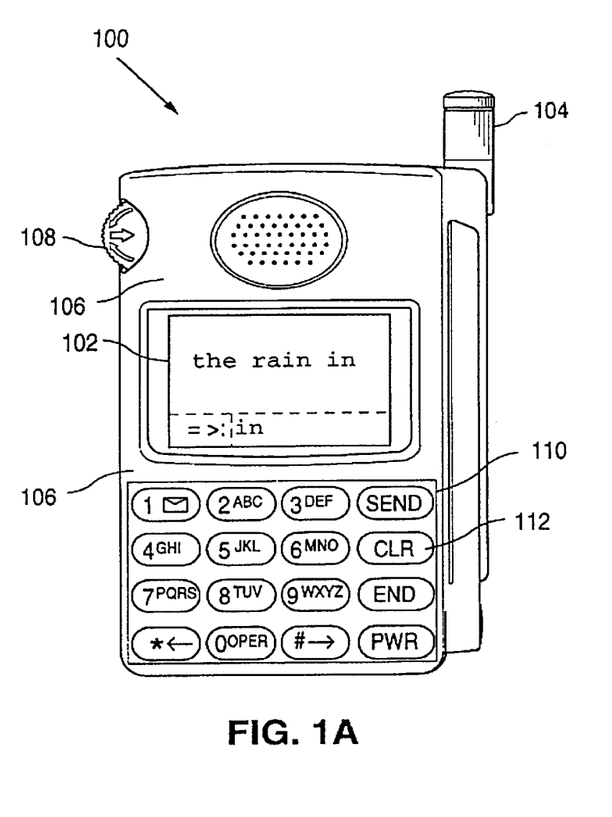
FIG. 1A shows a front view of a cellular telephone, which can be used to perform the present invention.
Figure 1B:
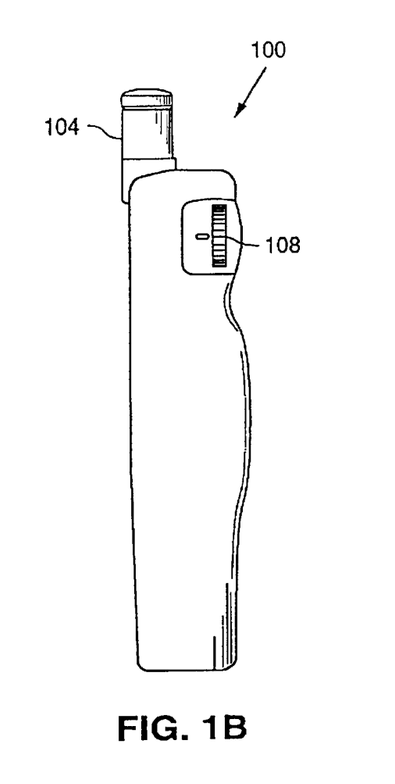
FIG. 1B shows a side view of the cellular telephone shown in FIG. 1A.

FIG. 1A shows a front view of an exemplary cellular telephone 100 including a display screen 102, an antenna 104, and a control panel 106. The control panel 106 includes a jog dial wheel 108 and a key panel 110. The jog dial wheel 108 can be moved in three directions (turn-up, turn-down, and press-in) as indicated by the three arrows. FIG. 1B shows a side view of the cellular telephone 100 to illustrate the side view of the jog dial wheel 108. A user can compose text messages by selectively pressing the alpha/numeric keys. The text messages composed are displayed on the display scree 102. To send the composed messages, the user then presses the "SEND" key on the key panel 110.

Typically, cellular telephones have a small keypad having only a few keys for entering alpha/numeric characters. As shown in FIG. 1A for example, the key panel 110 has only twelve alpha/numeric keys, and as many as nine different characters can be assigned to one key. Hence, it is time consuming and error prone to compose text messages by using the keys on a cellular telephone.

Therefore, there is a need for an improved method and apparatus for composing text messages in electronic devices, such as cellular telephones.

The present invention provides a method and apparatus to meet this need.

SUMMARY OF THE INVENTION

To address the shortcomings of the available art, the present invention provides novel and improved methods for composing text messages using electronic devices, such as cellular telephones.

In one aspect, the present provides a method of using an electronic device for composing a text message. The method comprises the steps of: (a) storing a word list containing a plurality of pre-selected words in the electronic device; (b) displaying the word list; (c) selecting one or more words from the word list to add to the text message; and (d) displaying the text message as it is composed.

In another aspect, the present invention provides a method of using an electronic device for composing a text message. The method comprises the steps of: (a) storing a word list containing a plurality of words in the electronic device; (b) displaying the word list; (c) selecting one or more words from the word list to add to the text message; (d) displaying the text message as it is composed; and (e) updating the word list based on words composed in the text message.

In still another aspect, the present invention provides a method of using an electronic device for composing a text message. The method comprises the steps of: (a) storing a word list containing a first set of pre-selected words and a second set of words in the electronic device; (b) displaying the word list; (c) selecting one or more words from the word list to add to the text message; (d) displaying the text message as it is composed; and (e) updating the second set of words based on words composed in the text message.

The present invention also provides a corresponding apparatuses for performing the methods discussed above.

BRIEF DESCRIPTION OF THE DRAWINGS

The foregoing and other features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENTS

The present invention provides novel methods and apparatuses for composing text messages on an electronic device such as a cellular telephone.

Figure 2:
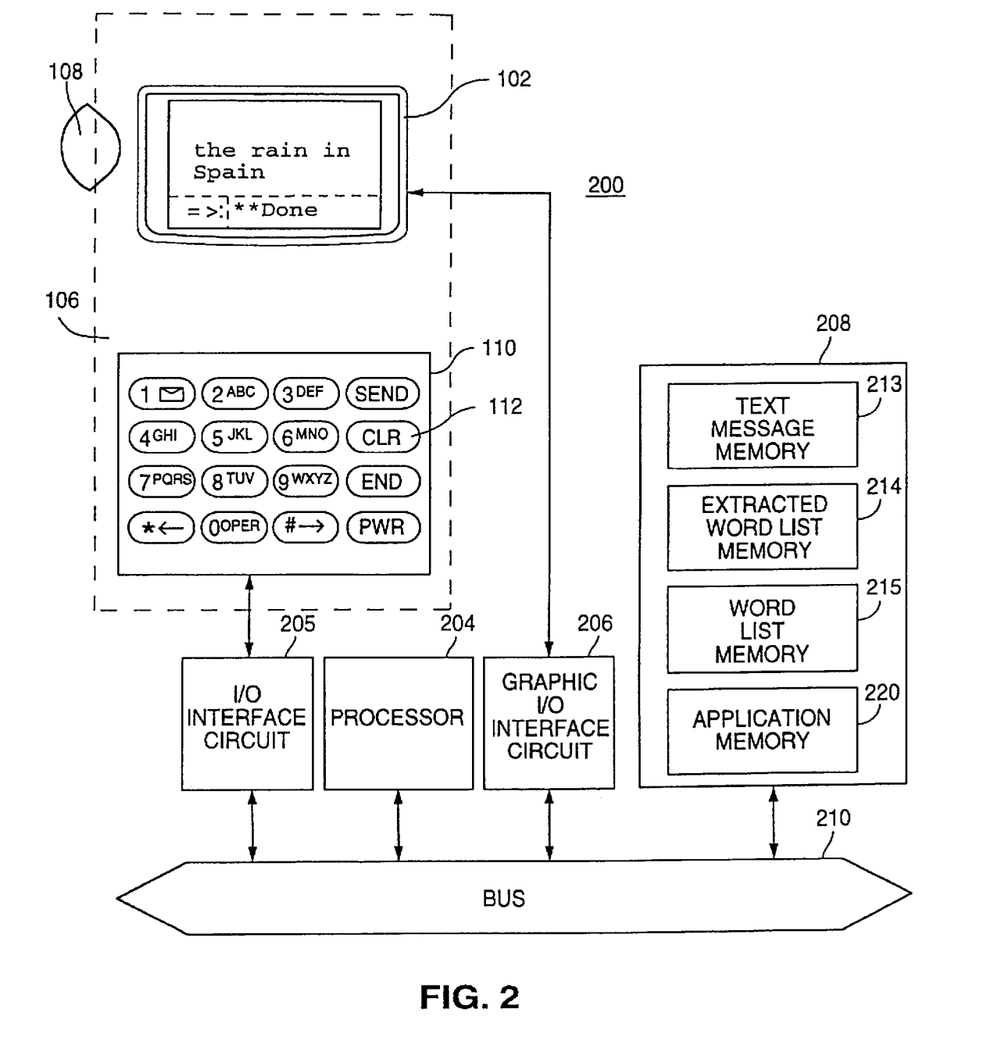
FIG. 2 shows a block diagram to illustrate some components of the cellular telephone shown in FIG. 1A.

FIG. 2 shows a block diagram 200 to illustrate some components of the cellular telephone 100 shown in FIG. 1A, in accordance with the present invention.

The block diagram 200 includes a processor 204, an I/O (input and output) interface circuit 205, a graphic I/O interface circuit 206, a memory 208, and a bus 210. The processor 204, the I/O interface circuit 205, the graphic I/O interface circuit 206, and the memory 208 are all coupled to the bus 210.

The memory 208 includes: (1) a text message memory 213 for storing the text message composed by a user, (2) an extracted word list memory 214 for storing the words extracted from a composed text message, (3) a word list memory 215 for storing a word list, and (4) an application memory 220 for storing an application to compose text messages in accordance with the present invention.

The processor 204 controls the operations of the I/O interface circuit 205, the graphic I/O interface circuit 206, the memory 208, and the display region 102. More specifically, the processor 204 is able to: (1) get access to the text message memory 213, the extracted word list memory 214, and the word list memory 215, (2) interact with the control panel 106 via the interface circuit 205, (3) display the words contained in the word list memory 215 on the display region 102 via the graphic I/O interface circuit 206, (4) execute the application stored in the application memory 220 to compose a text message, and to form an extracted word list by extracting the words from the composed text message, and (5) store the composed text message in the text message memory 215, and the extracted word list in the extracted word list memory 214.

In response to a user's movement of the jog dial wheel 108 or a user's press of any key on the key panel 110, the control panel 106 generates a request signal, which is in turn sent to the processor 204 via the I/O interface circuit 205. In response, the processor 204 executes the application stored in the application memory 220, thereby performing a particular function for the request signal.

Figure 3:
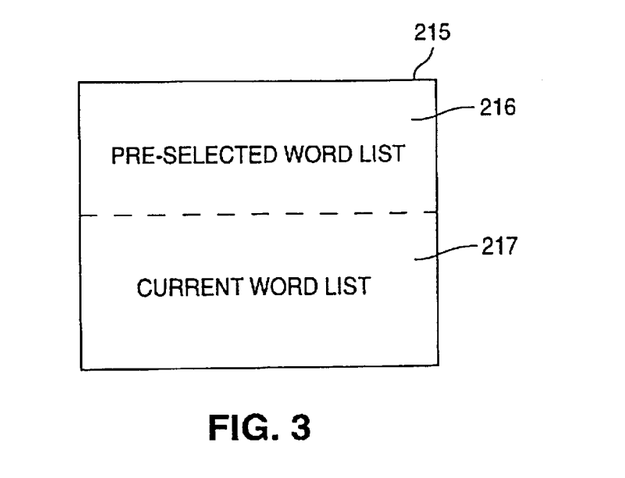
FIG. 3 shows the word list memory shown in FIG. 2 in greater detail, in accordance with the present invention.

FIG. 3 shows the word list memory 215 in greater detail, in accordance with the present invention.

As shown in FIG. 3, the word list memory 215 includes two memory areas 216 and 217. The memory area 216 contains a set of pre-selected words that are most frequently used by all users in general.

The memory area 217 contains a current word list including a set of words that are dynamically updated for a particular user. Each time a user composes a text message, the current word list stored in the memory area 217 is updated based on the words in the composed text message. Consequently, the memory area 217 contains a set of words that are most frequently used by a particular user. Thus, the current word list can adapt to vocabulary pattern changes of a particular user. A user's vocabulary pattern can change due to a variety of reasons. For example, a user may change his/her position or career; or a user may move from one organization to another.

In the embodiment shown in FIG. 3, the pre-selected word list in the memory area 216 contains up to twenty-five pre-selected words, and the current word list in the memory area 217 contains up to twenty five words. From data structure point of view, the words in memory areas 216 and 217 are linearly linked. The last word in the pre-selected word list links to the first word in the current word list; the last word in the current word list links to the first word in the pre-selected word list.

A word can be a string of alphabetic characters separated by a punctuation mark or a space. A word can also be a string of numeric characters separated by a punctuation mark, a space or an alphabetic character. An apostrophe is considered an alphabetic character (if the current language is English). Dashes, parenthesis, and semi-colons are considered as numeric characters. An individual punctuation mark, not considered either an alphabetic character or a numeric character, is considered a word.

Figure 4:
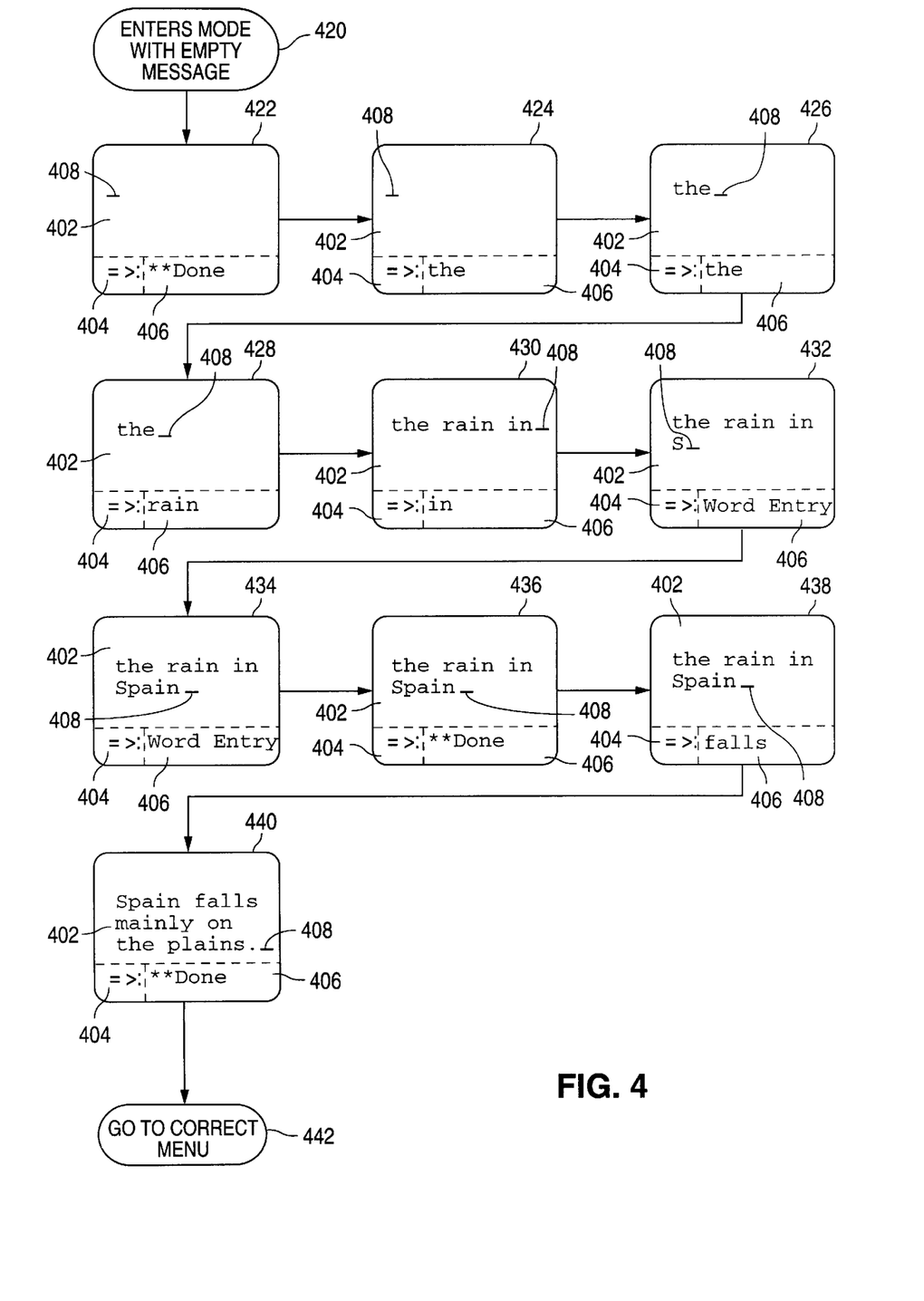
FIG. 4 shows a sequence of screen shots sequentially displayed on the display screen of the cellular telephone shown in FIG. 1A, in accordance with the present invention.

FIG. 4 shows a sequence of screen shots sequentially displayed on the display screen 102 to illustrate a process of composing a text message on the cellular telephone 100 by a user, in accordance with the present invention.

In describing FIG. 4, it is assumed that the words "the", "rain", "in", "falls", "mainly", "on", and "plains" are already stored in the word list memory 215, while the word "Spain" does not exist in the word list memory 215.

The cellular telephone 100 can operate in several modes. In describing the process shown in FIG. 4, it is assumed that the cellular telephone 100 has entered a message creation mode for enabling the processor 204 to execute the application stored in the application memory 220, thereby allowing a user to compose a text message on the cellular telephone 100. A message creation mode further includes two sub-modes, namely a word sub-mode and a character sub-mode. In a word sub-mode, a user can compose a text message by selecting the words from the word list memory 215. In a character sub-mode, a user can compose a text message by using the key panel 110. When the cellular telephone 100 first enters a message creation mode, it is always set in word sub-mode. Once the cellular telephone 100 enters the message creation mode, it can be switched between these two sub-modes.

Screen Shot 422

The screen shot 422 has three display regions 402, 404, and 406. The region 402 displays the text message that is being composed by the user. The region 404 displays an icon to indicate a push of the jog dial wheel 108. The region 406 alternately displays one of the words stored in the word list memory 215 in a circular fashion.

The region 402 contains a cursor 408 and three display lines. Each display line contains twelve (12) ASCII character spaces.

The cursor 408 can be moved to the left and right in the region 402 by pressing the right arrow "→" key and the left arrow "←" key on the key panel 110, respectively. Specifically, when the cursor 408 is located at the last space of the first display line, further pressing the right arrow "→" key moves the cursor 408 to the first space of the second display line. When the cursor 408 is located at the last space of second display line, further pressing the right arrow "→" key moves the cursor 408 to the first space of the third display line. When the cursor 408 is located at the last space of third display line, further pressing the right arrow "→" key moves the cursor 408 to the first space of the first display line, if there is no text line hidden at the end of a text message; or displays the next line of the text message if at least one text line of the text message is hidden at the end of the text message.

Similarly, when the cursor 408 is located at the first space of the third display line, further pressing the left arrow "←" key moves the cursor 408 to the last space of the second display line. When the cursor 408 is located at the first space of the second display line, further pressing the left arrow "←" key moves the cursor 408 to the last space of the first display line. When the cursor 408 is located at the first space of the first display line, further pressing the left arrow "←" key moves the cursor 408 to the last space of the third display line, if there is no text line hidden at the beginning of a text message; or displays the previous line of the text message if at least one text line of the text message is hidden at the beginning of the text message.

In a word sub-mode, pressing the "CLR" key on the key panel 110 erases a word, while in a character sub-mode, pressing the "CLR" key on the key panel 110 erases a character.

As shown in the screen shot 422, the cellular telephone 100 is set in a word sub-mode and the cursor 408 is located in the first space of the first display line, because the cellular telephone just enters the message creation mode.

Responsive to the movements of the jog dial wheel 108, the region 406 alternatively displays one of the words stored in the word list memory 215 in a circular fashion. Specifically, a user can locate a preceding word by turning the jog dial wheel 108 up and locate a trailing word by turning the jog dial wheel 108 down. For example, if the first word in the word list memory 215 is currently displayed in the region 406, turning the jog dial wheel 108 up causes display of the last word in the word list memory 215 on the region 406; turning the jog dial wheel 108 down causes the display of the second word in the word list memory 215 on the region 406. Similarly, if the last word in the word list memory 215 is currently displayed in the region 406, turning the jog dial wheel 108 down causes display of the first word in the word list memory 215 on the region 406; turning the jog dial wheel 108 up causes the display of the second last word in the word list memory 215 on the region 406.

As shown in the screen shot 422, when the cellular telephone first enters a message creation mode, the region 406 displays a special entry "Done". Selecting the special entry "Done" by pressing-in the jog dial wheel 108 causes the cellular telephone 100 to exit message creation mode, and move to another mode.

All subsequent screen shots (424, 426, 428, 430, 432, 434, 436, 438, and 440) have the same structure and functions as the screen shot 422.

Screen Shot 424

To locate the word "the" from the word list memory 215, the user turns the jog dial wheel 108 (up or down) until the word "the" is displayed on the region 406.

Screen Shot 426

To select the word "the" displayed in the region 406, the user presses-in the jog dial wheel 108. In response, the processor 204 executes the application stored in the application memory 220 to display word "the" on the region 402. The processor 204 then executes the application to move the cursor 408 to the end of the word "the".

Screen Shot 428

To locate the word "rain" from the word list memory 215, the user turns the jog dial wheel 108 (up or down) until the word "rain" is displayed on the region 406.

Screen Shot 430

To select the word "rain" displayed in the region 406, the user presses-in the jog dial wheel 108. In response, the processor 204 executes the application stored in the application memory 220 to display the word "rain" in the region 402. The processor 204 then executes the application to move the cursor 408 to the end of the word "rain".

To locate next the word "in" from the word list memory 215, the user turns the jog dial wheel 108 (up or down) until the word "in" displays on the region 406.

To select the word "in" displayed in the region 406, the user presses-in the jog dial wheel 108. In response, the processor 204 executes the application stored in the application memory 220 to display "in" in the region 402. The processor 204 then executes the application to move the cursor 408 to the end of the word "in".

Screen Shot 432

The screen shot 434 illustrates a process of entering a character "S" by using the "key 7" on the key panel 110. As shown in FIG. 1A, nine characters (7, P, p, Q, q, R, r, S, and s) are assigned to the "key 7". By consecutively pressing the "key 7", each of the nine characters can be alternatively displayed in the region 402. More specifically, the characters "7", "P", "p", "Q", "q", "R", "r", "S", and "s" can be selected by pressing the "key 7" one, two, three, four, five, six, seven, eight, or nine times, respectively. Thus, to select character "S", the user presses the "key 7" eight times.

Upon detecting that any of the keys on the key panel 110 has been pressed, the processor 204 executes the application stored in the application memory 220 to switch the cellular telephone 100 to character sub-mode (or keep the cellular telephone 100 in character sub-mode if the cellular telephone 100 is already set in character sub-mode). The processor 204 also executes the application to display "Word Entry" in the region 406. Selecting "Word Entry" by pressing the jog dial wheel 108 switches the cellular telephone 100 from character sub-mode to word sub-mode.

By pressing the right arrow "→" key (in case the same key is used to enter a different character), or pressing a different key, a user can indicate the completion of entering a character.

Screen Shot 434

The screen shot 432 illustrates a process of entering the characters of "p", "a", "i", and "n" via the key panel 110 by using the similar process as described in the screen shot 432. Specifically, the user presses the "key 7" three times to select character "p", the "key 2" three times to select character "a", the "key 4" seven times to select character "i", and the "key 6" five times to select character "n". In response, the processor 204 executes the application stored in the application memory 220 to display "pain" in the region 402 and moves the cursor 408 to the end of the word "Spain".

Screen Shot 436

To indicate completion of entering the word "Spain", the user selects the "Word Entry" displayed in the region 406 by pressing-in the jog dial wheel 108. In response, the processor 204 executes the application to switch the cellular telephone 100 from character sub-mode to word sub-mode. The processor 204 also executes the application to display the special entry "**Done" in the region 406.

Screen Shot 438

To locate the word "falls" from the word list memory 215, the user turns the jog dial wheel 108 (up or down) until the word "falls" is displayed on the region 406.

To select the word "falls" displayed in the region 406, the user presses-in the jog dial wheel 108. In response, the processor 204 executes the application stored in the application memory 220 to display the word "falls" on the region 402.

Screen Shot 440

The screen shot 440 illustrates a process of entering the four words "mainly", "on", "the", "plains" using the similar process as described in the screen shots 424 and 426.

Because the screen shot 440 contains four lines of the text message, the first line is hidden from the display region 402. The first line of the text message can be displayed by moving the cursor 408 upwards. However, if the first line of the text message is displayed on the display region 402, the forth line of the text message will be hidden from the display region 402.

To exit message creation mode, the user locates the "Done" from the word list by turning the jog dial wheel 108 (up or down). The user then presses-in the jog dial wheel 108 to select the special entry "Done". In response, the processor 204 executes the application to store the composed text message into the text message memory 213, and to update the word list stored in the word list memory 215 based on the words in the composed text message. After the word list has been updated, the processor 204 executes the application to exit the message creation mode and display an appropriate menu for the next operational mode.

If the user wishes to send the text message stored in the text message memory 214, he/she can dial a desired number and then press the "SEND" key on the key panel 110.

Figure 5:
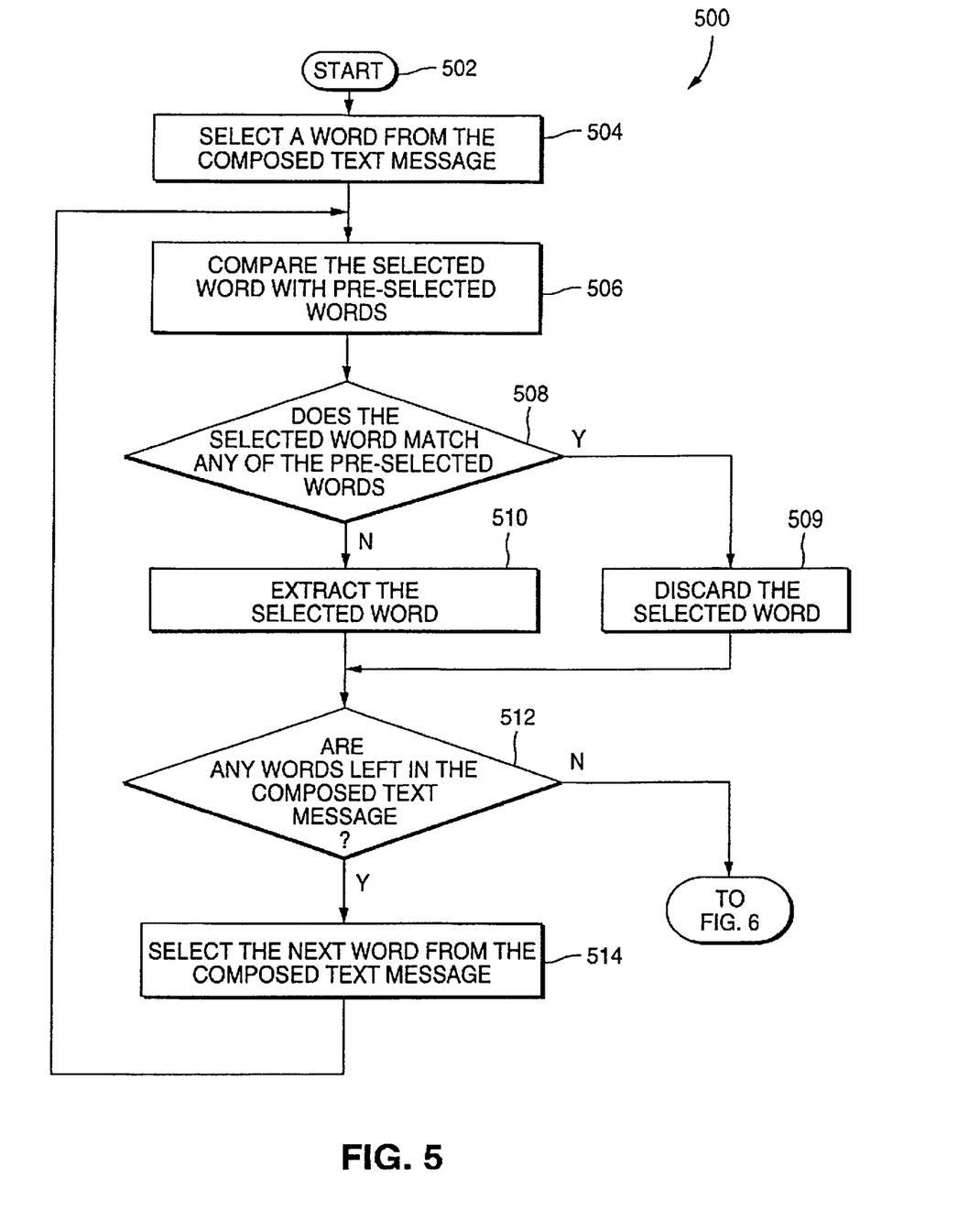
FIG. 5 shows a flowchart illustrating a process of forming an extracted word list containing the words extracted from a composed text message, in accordance with the present invention.

FIG. 5 shows a flowchart illustrating the process of forming an extracted word list containing the words extracted from the composed text message, in accordance with the present invention.

As shown in FIG. 5, step 504 selects a word from the composed text message stored in the text message memory 213.

Step 506 compares the selected word with the preselected words stored in the preselected words list memory 215.

Step 508 determines whether the selected word matches any of the pre-selected words. If the selected word matches one of the pre-selected words, the operation is led to step 509 to discard the selected word; if the selected word does not match any of the preselected words, the operation is led to step 510 to extract the selected word and store the extracted word in the extracted word list memory 214. The operation is then led to step 512.

Step 512 determines whether there are any words left in the composed text message. If there is at least one word in the composed text message left unprocessed, step 514 selects the next word from the composed text message. The operation is then led to step 506 to process the next word selected.

Figure 6:
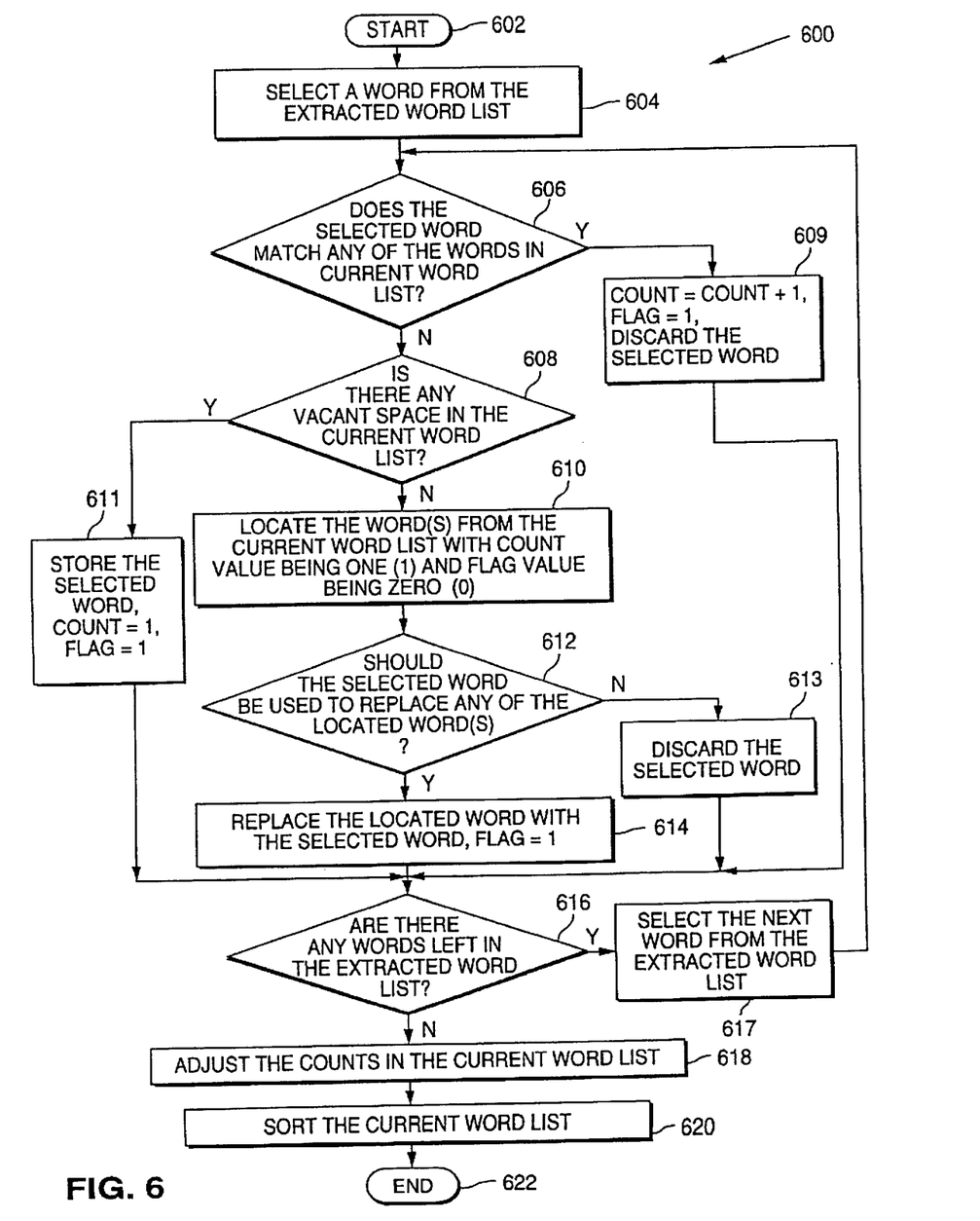
FIG. 6 shows a flowchart illustrating a process of updating the current word list, in accordance with the present invention.

If all the words in the composed text message have been processed, the operation is led to FIG. 6.

FIG. 6 shows a flowchart illustrating a process of updating the current word list stored in the current word list memory 217, in accordance with the present invention.

Each of the words stored in the memory area 217 has a count for indicating the occurrences of the word, and a flag for indicating that the word was used in the previous updating of the current word list. Before performing the process shown FIG. 6, it is assumed that the words in the current list have been sorted, and the smallest count value in the current word list has been adjusted (or normalized) to one (1).

As shown in FIG. 6, step 604 selects a word from the extracted word list formed by the process described in FIG. 5.

Step 606 determines whether the selected word matches any of the words in the current word list stored in the memory area 217. If the selected word does not match any of the words in the current word list, the operation is led to step 608; if the selected word matches one of the words in the current word list, the operation is led to step 609.

When the selected word matches a word in the current word list, step 609 increases the count for the word by one (1), sets the flag for the word to one (1), and discards the selected word. The operation is then led to step 616.

When the selected word does not match any of the words in the current word list, step 608 further determines whether there is any vacant space in the memory area 217.

When there is any vacant space in the memory area 217 (indicating the current word list contains less than twenty five words), step 611 stores the selected word in the current word list, and sets the count and flag for the replaced word to one (1). The operation is then led to step 616.

When there are no any vacant spaces in the current word list, step 610 locates the words from the current word list with the count value being one (1) and the flag value being zero (0). In another words, even a word in the current word list has the smallest count value, it will not be replaced if its flag value is one (1). This means that a word used in the last text message will not be replaced.

Step 612 determines whether the selected word should be used to replace any of the located words with count value being one (1). Specifically, step 612 compares the length of the selected word with those of the located words. If the length of the selected word is longer than, or equal to, the length of a located word, the operation is led to step 614; if the length of the selected word is shorter than those of the located words, the operation is led to step 613.

When step 612 determines that the selected word should not be used to replace any of the located words, step 613 discards the selected word. The operation is then led to step 616.

When step 612 determines that the selected word should be used to replace a located word, step 614 replaces the located word with the selected word, and sets the flag for the replaced word to one (1). Since the count for the located word is one (1), there is no need to change the count value.

Step 616 further determines whether there are any words left in the extracted word list. If there are one or more words in the extracted word list left unprocessed, the operation is led to step 617; if all words in the extracted word list have been processed, the operation is led to step 618.

When there are one or more words in the extracted word list left unprocessed, step 617 selects the next word from the extracted word list. The operation is then led to step 606 to process the next word selected.

When all words in the extracted word list have been processed, step 618 adjusts (or normalizes) the counts for the words in the current word list (if needed) to ensure the smallest count value is one (1).

Step 620 sorts the updated current word list.

In performing the steps shown in FIG. 6, if a word in the current word list does not appear in the extracted word list, the flag for the word is set to zero (0).

Figure 7:
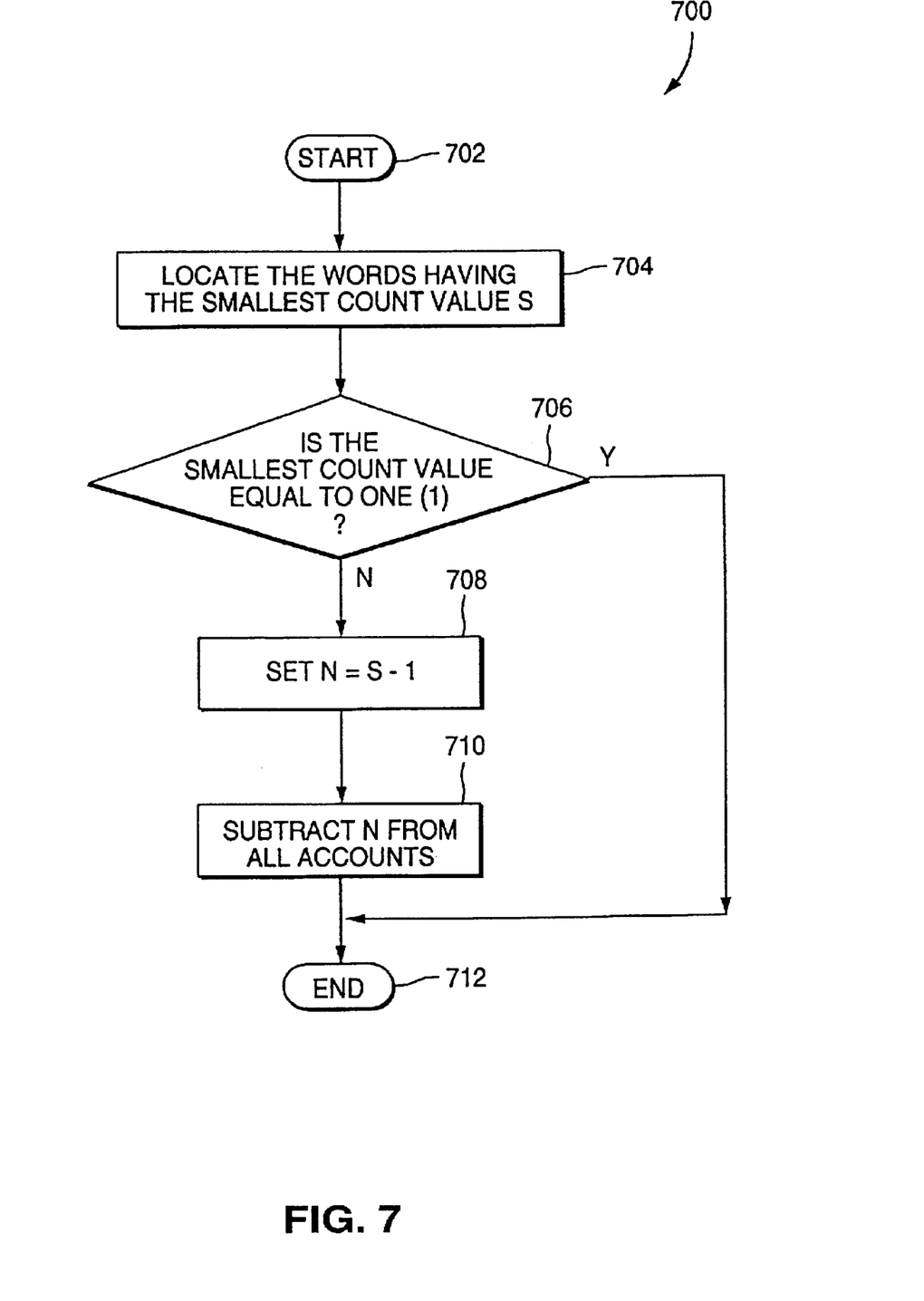
FIG. 7 shows a flowchart illustrating a process of adjusting the counts in the current word list, in accordance with the present invention.

FIG. 7 shows a flowchart illustrating a process of adjusting the counts as shown in step 618 in FIG. 6, in accordance with the present invention.

As shown in FIG. 7, step 704 locates the words from the current word list, which have the smallest count value S.

Step 706 determines whether S is equal to one (1). If S is equal to one (1), no adjustment is needed. Thus, the operation is led to step 712 to end the operation. If S is not equal to one, the operation is led to step 708.

Step 708 sets an integer N=S−1, so that S−N=1.

Step 710 subtracts N from all counts in the current list, so that the smallest count value S in the updated current list is equal one (1). These counts will be used to update the current word list when the user composes a subsequent text message.

In the present invention, the program for performing the steps shown in FIGS. 5–7 can be stored in the application memory 220 and executed by the processor 204.

It should be noted that the embodiments of the present invention describe text message composition using the English language. However, the principle described here can readily apply to other languages.

Although the present invention has been shown and described with respect to preferred embodiments, various changes and modifications are deemed to lie within the sprit and scope of the invention as claimed. The corresponding structures, materials, acts, and equivalents of all means or step plus function elements in the claims which follow are intended to include any structure, material, or acts for performing the functions in combinations with other claimed elements as specifically claimed.

What is claimed is:

1. A method of using an electronic device for composing a text message, comprising the steps of:

(a) storing a word list containing a plurality of words in the electronic device;

(b) displaying the word list;

(c) selecting one or more words from the word list to add to the text message;

(d) displaying the text message as it is composed; and (e) updating the word list based on words composed in the text message, wherein this updating step includes the steps of (i) selecting a word from the text message;
(ii) detecting a word in the word list with the smallest frequency of use in previous text messages; and
(iii) replacing the detected word with the selected word.

2. A method of using an electronic device for composing a text message comprising the steps of:
  (a) storing a word list containing a plurality of words in the electronic device;
  (b) displaying the word list;
  (c) selecting one or more words from the word list to add to the text message;
  (d) displaying the text message as it is composed; and
  (e) updating the word list based on words composed in the text message, and wherein this updating step includes the steps of
    (i) selecting a word from the text message; and
    (ii) determining whether the number of words in the word list exceeds a predetermined number, and if not, adding the selected word to the word list.

3. A method of using an electronic device for composing a text message comprising the steps of:
  (a) storing a word list containing a first set of pre-selected words and a second set of words in the electronic device;
  (b) displaying the word list;
  (c) selecting one or more words from the word list to add to the text message;
  (d) displaying the text message as it is composed; and
  (e) updating the second set of words based on words composed in the text message; wherein the updating step further comprises
    (i) selecting a word from the text message;
    (ii) detecting a word in the second set of words with the smallest frequency of use in previous text messages; and
    (iii) replacing the detected word with the selected word.

4. The method of claim 3, wherein the detected word is replaced with the selected word only if the length of the detected word is shorter than that of the selected word.

5. A method of using an electronic device for composing a text message comprising the steps of:
  (a) storing a word list containing a first set of pre-selected words and a second set of words in the electronic device;
  (b) displaying the word list;
  (c) selecting one or more words from the word list to add to the text message;
  (d) displaying the text message as it is composed; and
  (e) updating the second set of words based on words composed in the text message; and wherein the updating step includes the steps of
    (i) selecting a word from the text message;
    (ii) determining whether the selected word matches any word in the first set of words, if yes, discarding the selected word; and
    (iii) determining whether the number of words in the second set of words exceeds a predetermined number, and if not, adding the selected word to the second set of words.

6. An apparatus of using an electronic device for composing a text message, comprising:
  (a) means for storing a word list containing a plurality of words in the electronic device;
  (b) means for displaying the word list;
  (c) means for selecting one or more words from the word list to add to the text message;
  (d) means for displaying the text message as it is composed; and
  (e) means for updating the word list based on words composed in the text message, the updating means including
    (i) means for selecting a word from the text message;
    (ii) means for detecting a word in the word list with the smallest frequency of use in previous text messages; and
    (iii) means for replacing the detected word with the selected word.

7. The apparatus of claim 6, wherein the replacing means replaces the detected word with the selected word only if the length of the detected word is shorter than that of the selected word.

8. An apparatus of using an electronic device for composing a text message, comprising:
  (a) means for storing a word list containing a plurality of words in the electronic device;
  (b) means for displaying the word list;
  (c) means for selecting one or more words from the word list to add to the text message;
  (d) means for displaying the text message as it is composed; and
  (e) means for updating the word list based on words composed in the text message, the updating means including
    (i) means for selecting a word from the text message; and
    (ii) means for determining whether the number of words in the word list exceeds a predetermined number, and means for adding the selected word to the word list if the number of words in the word list does not exceeds the predetermined number.

9. The apparatus of claim 8, the electronic having user operable text keys for forming one or more words to add to the text message.

10. An apparatus of using an electronic device for composing a text message, comprising:
  (a) means for storing a word list containing a first set of pre-selected words and a second set of words in the electronic device;
  (b) means for displaying the word list;
  (c) means for selecting one or more words from the word list to add to the text message;
  (d) means for displaying the text message as it is composed; and
  (e) means for updating the second set of words based on words composed in the text message, and wherein the updating means includes
    (i) means for selecting a word from the text message;
    (ii) means for detecting a word in the second set of words with the smallest frequency of use in previous text messages; and
    (iii) means for replacing the detected word with the selected word.

11. The apparatus of claim 10, wherein the replacing means replaces the detected word with the selected word only if the length of the detected word is shorter than that of the selected word.

12. An apparatus of using an electronic device for composing a text message, comprising:
  (a) means for storing a word list containing a first set of pre-selected words and a second set of words in the electronic device;
  (b) means for displaying the word list;
  (c) means for selecting one or more words from the word list to add to the text message;
  (d) means for displaying the text message as it is composed; and
  (e) means for updating the second set of words based on words composed in the text message and wherein the updating means includes
    (i) means for selecting a word from the text message;
    (ii) means for determining whether the selected word matches any word in the first set of words, and means for discarding the selected word if the selected word matches any word in the first set of words; and
    (ii) means for determining whether the number of words in the second set of words exceeds a predetermined number, and means for adding the selected word to the second set of words if the number of words in the second set or words does not exceed the predetermined number.

\* \* \* \* \*

UNITED STATES PATENT AND TRADEMARK OFFICE
CERTIFICATE OF CORRECTION

PATENT NO. : 6,205,342 B1
DATED : March 20, 2001
INVENTOR(S) : Oakes et al.

It is certified that error appears in the above-identified patent and that said Letters Patent is hereby corrected as shown below:

Title page,
Item [73] Assignees:, delete the comma after "Sony Electronics".

Column 3,
Line 2, after "via the", insert -- I/O --.

Column 5,
Line 50, delete "434" and insert therefor -- 432 --.

Column 6,
Line 8, delete "432" and insert therefor -- 434 --.
Line 41, delete "forth" and insert therefor -- fourth --.

Column 7,
Line 49, delete "no" and insert therefor -- not --.
Line 52, delete "another" and insert therefor -- other -- , and after "even" insert -- if --.

UNITED STATES PATENT AND TRADEMARK OFFICE
CERTIFICATE OF CORRECTION

PATENT NO. : 6,205,342 B1
DATED : March 20, 2001
INVENTOR(S) : Oakes et al

It is certified that error appears in the above-identified patent and that said Letters Patent is hereby corrected as shown below:

<u>Column 8,</u>
Line 48, delete "sprit" and insert therefor -- spirit --.

<u>Column 10,</u>
Line 39, delete "exceed" and insert therefor -- exceed --.

<u>Column 12,</u>
Line 12, delete "or" and insert therefor -- of --.

Signed and Sealed this

Ninth Day of October, 2001

*Attest:*

*Attesting Officer*

NICHOLAS P. GODICI
*Acting Director of the United States Patent and Trademark Office*